May 17, 1966  D. L. FITTON ET AL  3,251,553
PRESSURIZED NOZZLE GIMBAL

Filed Aug. 8, 1962  2 Sheets-Sheet 1

INVENTORS
DAVID L. FITTON
LEANDER H. LIPPINCOTT
BY Vernon F. Hauschild
ATTORNEY

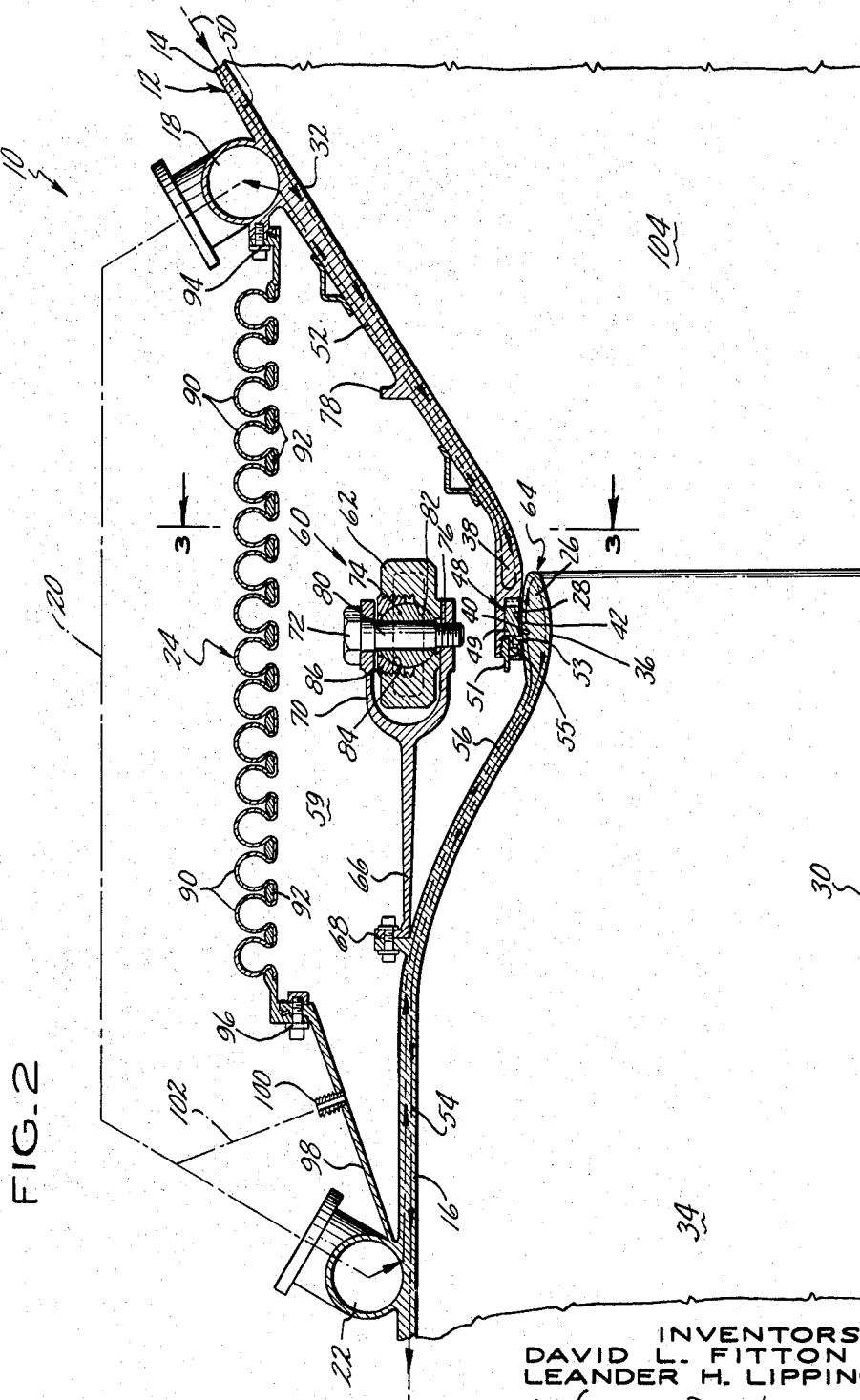

United States Patent Office 3,251,553
Patented May 17, 1966

3,251,553
PRESSURIZED NOZZLE GIMBAL
David L. Fitton, Canton, and Leander H. Lippincott, Middletown, Conn., assignors to United Aircraft Corporation, East Hartford, Conn., a corporation of Delaware
Filed Aug. 8, 1962, Ser. No. 215,666
9 Claims. (Cl. 239—127.3)

This invention relates to rocket engines and more particularly to rocket engines which comprises two parts such that the thrust nozzle is movable with respect to the remainder of the rocket for vectoring purposes.

It is an object of this invention to provide a two-piece rocket nozzle such that the movable nozzle portion of the rocket case is joined to the fixed portion of the rocket case at the throat of a convergent-divergent nozzle and wherein the connection between the nozzle portions is made using a spherical joint with radial clearance such that axial loads between the two pieces or portions of the rocket case do not pass through the spherical joined parts and so that, upon deflection, some of the radial loading between the two portions of rocket case will be absorbed by the spherical joint.

It is a further object of this invention to teach a two-piece rocket case as described above wherein a gimbal arrangement connects the two pieces of the rocket case so as to absorb all axial loads therebetween and to absorb a portion of the radial loads therebetween and wherein the gimbal means closely envelopes the nozzle throat so as to lower the deflection of the gimbal means which varies as the cube of the radius thereof.

It is still a further object of this invention to utilize gimbal means as described above using ball joint connections.

It is still a further object of this invention to provide a two-piece rocket nozzle case as described above and including sealable means enveloping said gimbal means and said throat and sealably joining the two pieces of the rocket case to form a sealed annular chamber therewith and into which fluid under pressure is provided to prevent the exhaust gases from escaping from the aforementioned joint, to absorb at least some of the axial loading due to exhaust gas reaction against the rocket nozzle case or to balance the forward thrust of the rocket nozzle, to cool the rocket case and to provide film cooling of the aforementioned spherical joint and nozzle case inner wall.

It is still a further object of this invention to control the location of the radial gap between the two-piece nozzle and thereby control the pressure in the sealed cavity therearound to balance the forward thrust of the rocket nozzle or expansion chamber to reduce the size and weight of the rocket case gimbal ring connection.

These and other advantages and objects of my invention will be evident to one skilled in the art upon viewing the attached drawing and the description thereof which follows:

FIG. 2 is an enlarged cross-section view through the throat of a two-piece nozzle case showing my invention in greater particularity than is shown in FIG. 1.

This application constitutes an improvement over U.S. patent application Serial No. 110,060, which was filed on May 15, 1961, and is now Patent No. 3,184,917, on a Reinforced Seal for Rocket Nozzle in the names of Zephirin A. Caouette and David L. Fitton.

Figure 1:
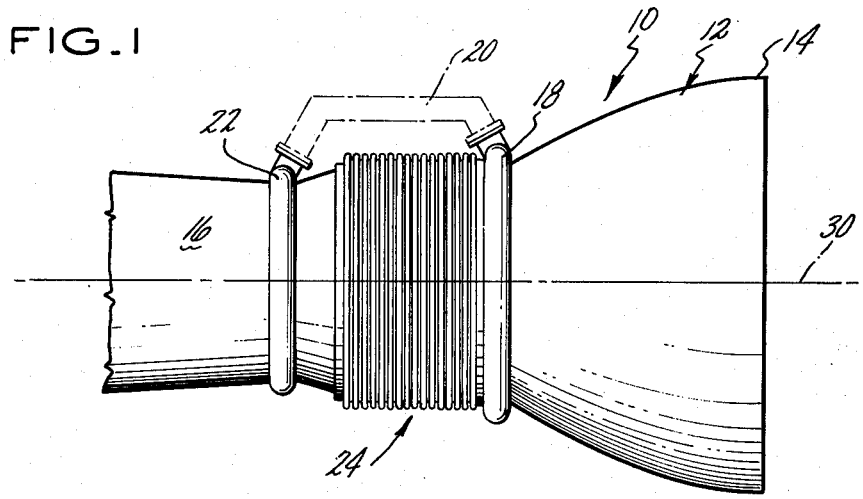
FIG. 1 is a partial external view of a two-piece rocket nozzle case using my invention.

Referring to FIG. 1, we see rocket engine 10, which is preferably of circular cross-section and concentric about axis 30 and of the liquid propellant type and which includes rocket case 12 comprising movable and divergent nozzle case 14 and a fixed and convergent combustion chamber defining case 16. Preferably, as best shown in FIG. 2, the propellant is flow through the walls of nozzle case 14 into ring manifold 18 and thence through conduit connection 20 into ring manifold 22 from whence it flows into conduits in the wall of combustion chamber case 16, all for the purpose of cooling cases 14 and 16. Since it is an object of this invention to provide thrust vectoring, nozzle case 14 is mounted on fixed case 16 in a fashion to be described hereinafter and flexible seal 24 is connected to join cases 14 and 16 so that no leakage occurs through the joint connecting the two pieces, 14 and 16, of the rocket case.

Referring to FIG. 2, we see my invention in greater particularity and note that forward case 16 is convergent with respect to axis 30 at its aft end and culminates in ring 26 which has an exterior spherical surface 28 extending through an axial arc at a radius which described spherical surface 28 with respect to axis 30. After case 14 is generally divergent with respect to axis 30 and provides a divergent expansion surface 32 against which the products of combustion from the combustion chamber 34 may expand after passing through nozzle throat 36, which throat is defined by the inner surface of ring 26 of case 16. It will be noted that ring 38 is located at the forward end of case 14 and includes interior spherical surface 40 which surrounds in spaced radial relation the exterior surface 28 of ring 26. Interior spherical surface 40 also extends through an axial arc and is at a radius of curvature from axis 30 which is greater than the radius of curvature of exterior spherical surface 28 thereby providing radial gap 42 therebetween.

Figure 3:
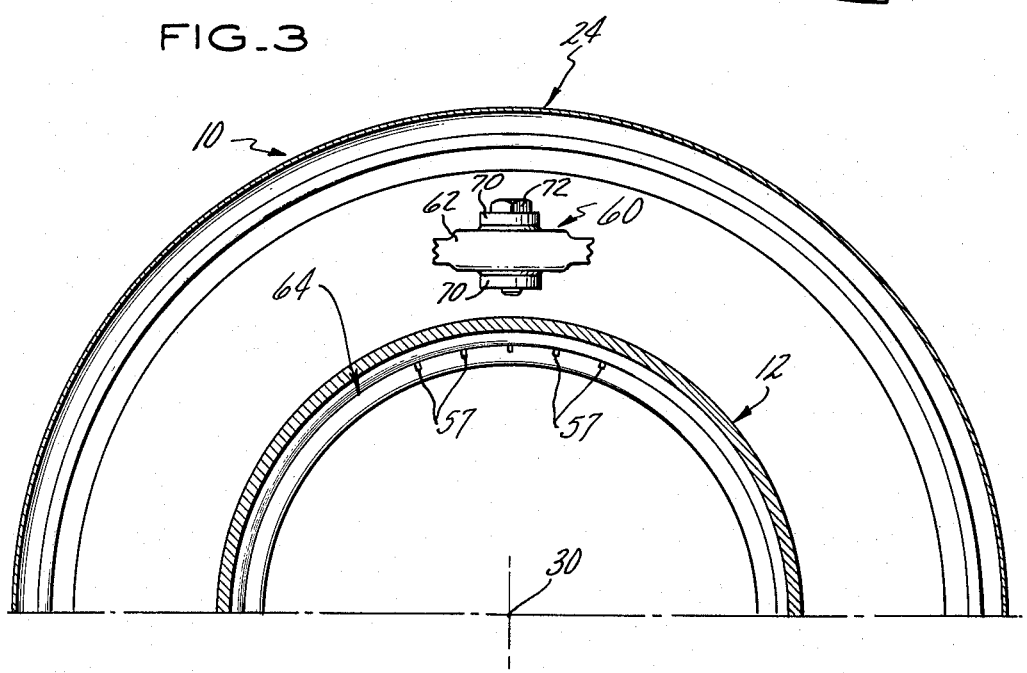
FIG. 3 is a view taken along line 3—3 of FIG. 2.

Seal ring unit 48 seals between the radially spaced spherical surfaces 40 and 28 of cases 14 and 16 at throat 36 and consists of piston ring retaining member 49, which is held in position by a nut 51 and which supports piston ring 53 which bears against external spherical surface 28 and also supports piston ring 55 which bears against the inner surface of nut 51. Spherical surface 28 may have substantially axially extending grooves 57 (FIG. 3) therein to permit the film cooling of expansion surface 32 by pressurized fluid, such as one of the propellants which is injected into annular cavity 59 in a fashion to be described hereinafter.

It will be noted that ring manifold 18 projects from the outer surface of case 14 while ring manifold 22 projects from the outer case 16. Since fluid is used to propel rocket engine 10, propellant is passed through embedded tubes or drilled passages 50 in case 14 toward nozzle throat 36 and then through embedded tubes or drilled passages 52 away from passage 36 and into manifold 18, from whence it passes through passage 20 into manifold 22 and then through case 16 in embedded tubes or drilled passages 56 toward nozzle throat 36 and through drilled passages or embedded tubes 54 away from throat 36. The purpose of this propellant flow is to cool cases 14 and 16.

Cases 14 and 16 are connected through gimbal means 60 which comprises gimbal ring 62 which concentrically envelopes axis 30 in substantial radial alignment with throat 36 and spherical joint 64 which is formed by external spherical surface 28 and internal spherical surface 40. Substantially axially extending arm 66 extends from flange and bolt connection 68 on case 16 and supports Y-shaped yoke 70 at its after end to receive bolt 72 which passes through aligned holes in yoke 70 and ball 74 and is threaded into one of the aligned holes of the yoke 70 at 76. Forward arms 66 preferably extend through about 40° of circumferential arc about axis 30 and are two in number positioned at diametrically opposite stations on case 16, such as the 12 o'clock and the 6 o'clock positions. Similar yoked arms (not shown) also join gimbal ring 62 in the same fashion as forward arms 66, but these arms extend aft or rearwardly from gimbal ring 62 and connect in flange and bolt fashion, as shown at 68 with respect to forward arm 66, to flange 78 on case 14. These arms, which connect to flange 78, will be called aft arms and are preferably two in number positioned at diametrically operated stations on case 14 perpendicular to the stations occupied by forward arms 66. It will be noted that ball 74 of the ball joints in the gimbal assembly 60 is snugly enveloping bolt shaft 80 and is snugly enveloped by spherical surface 82 of gimbal ring 62 and spherical surface 84 of nut 86, which secures ball 74 in position. Accordingly, since forward arms 66 and the aft arms, (not shown but preferably identical with forward arm 66, but extending rearwardly from gimbal ring 62 to flange 78) are either axially extending or are sufficiently rigid that there is no axial play in gimbal means 60 and hence gimbal means 60 absorbs all axial loading between cases 14 and 16.

It will be noted that gimbal means 60 is positioned but a small distance radially outward of throat 36 to reduce the deflection thereof, which varies as the cube of the radius. It will further be noted that as the radial deflection in gimbal means 60 reaches a predetermined amount; namely, the amount of radial gap 42 in spherical joint 64, spherical surfaces 28 and 40 abut to thereafter share further the radial loading between cases 14 and 16 with gimbal unit 60. It will still further be noted that due to the lack of axial play in gimbal means 60 and the radial gap 42 in spherical joint 64, no axial loading between cases 14 and 16 is carried by rocket case spherical joint 64.

Flexible seal 24, which is preferably a corrugated cylinder 90 having stiffener rings 92 in the inner corrugations thereof, extends between and is connected to cases 14 and 16 through conventional flange and bolt connections 94 and 96. While corrugated cylinder or sleeve 90 is shown connected to conical case 98 which either projects from or forms part of case 16, it will be understood that the corrugated sleeve could as well join directly to case 16 if the diameters were common. Seal 24 surrounds and envelopes throat 36, a spherical joint 64, gimbal means 60 and connects with cases 14 and 16 to form sealed annular cavity 59 with cases 14 and 16. Cooling fluid, such as one of the rocket fluid propellants, may be injected into cavity 59 through injection port 100 by any convenient means such as conduit 102 connected to conduit line 20.

The pressure within rocket case 14 is such that it is maximum at throat 36 and diminishes downstream thereof. By selecting the position of radial gap 42, and hence the exhaust gas pressure to which the downstream end of said gap is subjected, we control the propellant pressure required within cavity 59 to insure that there is the required pressure gradient across the gap to cause the propellant to flow through the gap 42 and cool expansion surface 32 at the desired rate. If the pressure in cavity 59 is too great, propellant will be wasted and if the pressure within cavity 59 is too small, the exhaust gases will flow through the gap 42 into the cavity 59. Accordingly, by properly positioning or locating gap 42, we can control propellant pressure required within chamber 59. Further, with the pressure in chamber 59 so established, the radius of bellows member 24 may be so selected that the forward thrust caused by the exhaust gases expand against expansion surface 32 of case 14 may be exactly balanced by the pressure of the fluid within chamber 59 acting across a selected area of case 14 determined by the position of bellows 24. The pressurized fluid which fills annular cavity 59 serves to cool the walls of cases 14 and 16, will also serve to absorb axial loading therebetween and balance the forward thrust of the rocket nozzle, and also provides film cooling of expansion surface 32 by controllable emission of the fluid propellant through grooves 57 (FIG. 3) and into the expansion chamber 104 along surface 32.

These and other advantages will be apparent to those skilled in the art upon the reading of this specification.

We claim:
1. A two-piece rocket nozzle of circular cross section and concentric about an axis and defining a rocket chamber therewithin comprising a fixed forward section and a movable after section, a spherical joint connected to and joining said sections and including two rings having radially spaced spherical surfaces defining a radial gap therebetween, gimbal means positioned in a circle slightly larger than said spherical joint connecting said sections, a flexible seal connecting said sections and enveloping said spherical joint and said gimbal means to form a pressurizable annular chamber with said sections which annular chamber communicates with said radial gap.

2. A two-piece rocket nozzle of circular cross section and concentric about an axis and defining a rocket chamber therewithin comprising a fixed forward section and a movable after section, a spherical joint connected to and joining said sections and including two rings having radially spaced spherical surfaces defining a radial gap therebetween, gimbal means positioned in a circle slightly larger than said spherical joint connecting said sections, a flexible seal connecting said sections and enveloping said spherical joint and said gimbal means to form a sealed annular chamber with said sections which annular chamber communicates with said radial gap, and means to inject pressurized fluid into said annular chamber nd said gap.

3. Apparatus according to claim 2 wherein said gimbal means includes a ring enveloping said spherical joint in spaced radial relation and first arm connected to said forward section at at least two diametrically opposed first stations and second arms connected to said after section at at least two diametrically opposed second stations perpendicular to said first stations and including snug ball joints connecting said first and second arms to said ring so that all axial loading between said sections passed through said gimbal means.

4. Apparatus according to claim 3 wherein said first and second arms are axially extending.

5. Apparatus according to claim 2 wherein said two rings of said spherical joint include a first ring attached to said forward section and having an exterior spherical surface extending through a short axial arc, a second ring attached to said after section and having an interior spherical surface extending through a short axial arc and being of slightly larger radius than said exterior spherical surface so that said interior spherical surface surrounds said exterior spherical surface in spaced radial relation.

6. Apparatus according to claim 5 and including means for sealing between said spherical surfaces.

7. Apparatus according to claim 6 and including grooves in said exterior spherical surface to permit controlled leakage of fluid from said annular chamber into said rocket chamber.

8. A two-piece vectorable nozzle comprising a convergent forward case and a divergent after case cooperating to define a convergent-divergent exhaust nozzle passage with a minimum area throat, a spherical joint with radial play thereto joining said cases at said throat including an outer diameter surface on said forward case and an enveloping inner diameter surface on said after case defining a radial gap communicating with said passage downstream of said throat, gimbal means closely surrounding said throat and connecting said cases, seal means enveloping said gimbal means and connected to said cases to form a sealed annular chamber therewith, which annular chamber communicates with said radial gap, and means to fill said annular chamber and said radial gap with pressurized fluid.

9. Apparatus according to claim 8 including means to discharge pressurized gases through said passage such that maximum pressure is found at said throat and diminishes downstream thereof, and wherein said radial play in said spherical joint communicates with said passage slightly downstream of said throat and at a location which is subjected to a pressure slightly lower than the pressure within said pressurized fluid, and further wherein said seal means is an axially expandable cylinder of selected diameter such that the pressure in said annular chamber balances the forward thrust generated by said gases passing through said passage and acting upon said divergent after case.

References Cited by the Examiner

UNITED STATES PATENTS

| | | | |
|---|---|---|---|
| 1,821,274 | 9/1931 | Plummer | 285—261 X |
| 2,721,746 | 10/1955 | Schlindler | 285—228 |
| 2,904,356 | 9/1959 | Love | 285—265 X |
| 3,032,982 | 5/1962 | Gaubatz | 60—35.55 |
| 3,048,010 | 8/1962 | Ledwith et al. | 60—35.55 |
| 3,049,877 | 8/1962 | Sherman | 60—35.55 |
| 3,069,853 | 12/1962 | Eder | 60—35.55 |

MARK M. NEWMAN, *Primary Examiner.*

ABRAM BLUM, *Examiner.*

W. A. SCHUETZ, A. L. SMITH, *Assistant Examiners.*